Jan. 6, 1959     L. E. CURRISTON     2,867,405
INSTRUMENT SHOCK MOUNT
Filed Nov. 6, 1953
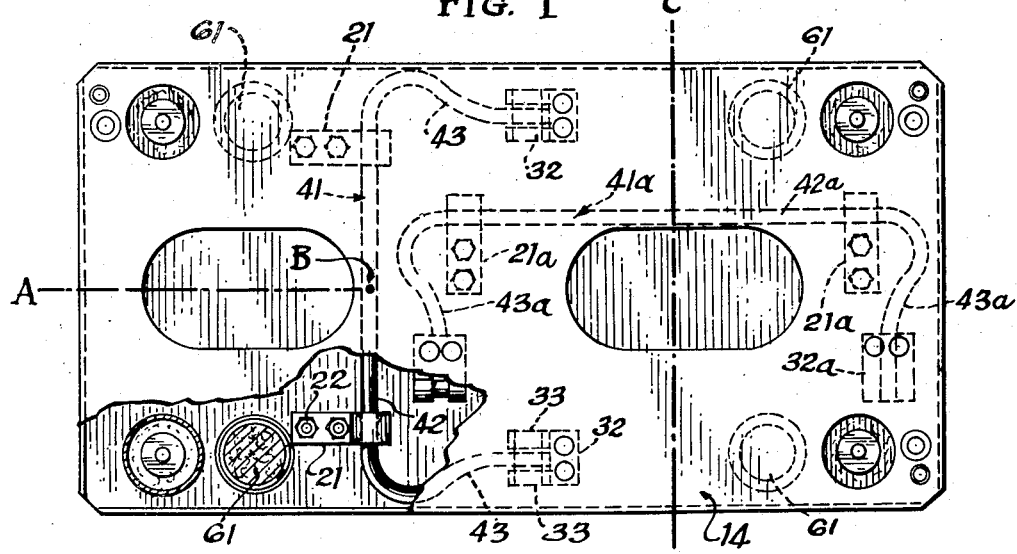
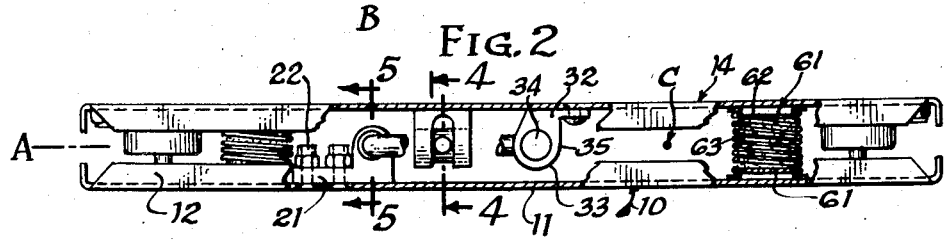
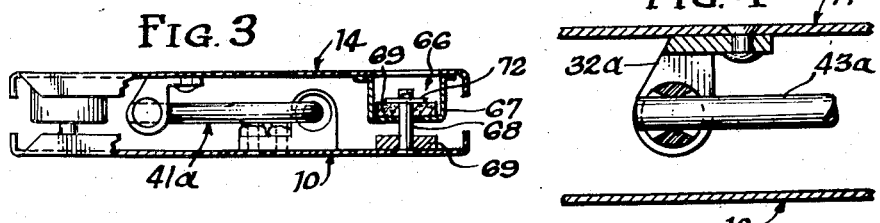 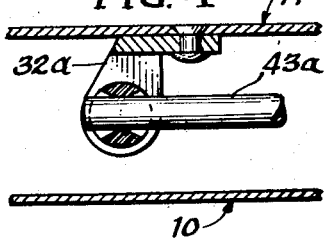
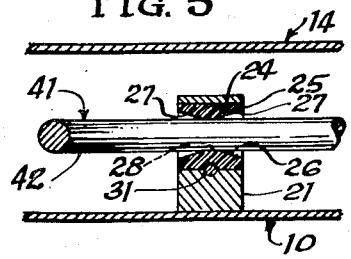
INVENTOR.
Loren E. Curriston
BY
Attorney

United States Patent Office 2,867,405
Patented Jan. 6, 1959

2,867,405

INSTRUMENT SHOCK MOUNT

Loren E. Curriston, Grand Rapids, Mich., assignor to Lear, Incorporated, Grand Rapids, Mich.

Application November 6, 1953, Serial No. 390,541

2 Claims. (Cl. 248—358)

This invention relates to a shock mount for a gyroscopic or other instrument, wherein it is desired to absorb vibration which is normally in the nature of a translational displacement while rendering the instrument immune to rotationally-applied forces.

Shock mounting of instruments carried aboard aircraft is a common practice, and a great variety of devices for this purpose are commercially available. However, all of these known to me, while absorbing vibration in a translational sense, fail to incorporate provision for restraining movement of the mounted instrument in angular senses. That is to say, a conventional, coiled compression-spring, shock absorbing medium, with or without damping means, will also allow freedom of movement of the mounted object in angular senses since a coiled spring is freely deformable in all three planes.

Instruments incorporating gyroscopes depend for their function on the principle that the spin axis, unless disturbed by a precessive force, will remain fixed in space. Precessive forces give rise to displacement of the spin axis which is measured as an angular deviation. Specifically, and assuming as an example a directional gyroscope as used aboard an airplane for detecting angular departure of the craft in yaw, it is fundamental that only the departure of the fore-and-aft axis of the airplane from a predetermined reference be measured, unaffected by spurious angular increments or decrements which may be undesirably introduced by the shock mount generally interposed between the airplane and gyroscope.

Accordingly, the principal object of this invention is to provide a shock-mounted platform for an instrument or device which will absorb translational vibration but is rigid with respect to forces tending to displace the same angularly.

Other objects lie in providing a shock-mounted platform as aforesaid which preserves those features hitherto found desirable for performing the shock-absorbing function, as such, and which may also include damping means hitherto also found completely satisfactory.

Another object is to provide novel linkages for connecting the platform to the fixed part of the shock mount, which may be easily adapted to present designs of shock mounts without alteration in the dimensions thereof.

Further objects will become apparent from the following description which, taken together with the accompanying drawing, discloses a preferred manner of carrying the invention into practice, and in which latter:

Fig. 1 shows a top plan view of the shock mount;

Fig. 2 shows a side elevational view thereof;

Fig. 3 is a right hand end elevational view;

Fig. 4 shows a cross section taken on the line 4—4 of Fig. 2, and

Fig. 5 is a cross section taken on the line 5—5 of Fig. 2.

In some of the views parts have been omitted or broken away for clarity.

Broadly considered the invention comprises a plate-like support element for securement to a fixed location surmounted by a generally similar platform spaced therefrom to receive a plurality of vibration absorbing members of any preferred form which are suitably connected to the support element and platform. If preferred a plurality of damping devices may be similarly interposed. Also disposed between the support plate and platform is a linkage for restraining angular displacement of the platform in at least two orthogonal planes. If it is desired to provide restraint in the third plane a second linkage may be employed. Each link is generally of U-shape and is arranged for pivotal movement about an axis represented by the base portion of the U, while additional restraint is applied to confine such portion to rotation only about such axis. The members for thus restraining rotation of the link are secured to the platform and support element respectively. The remaining linkage or linkages are similar except that rotation is permitted about an axis or axes which are perpendicular to the first.

Hence, turning to the drawing, there is provided a fixed support in the form of a plate 10 comprising a flat expanse 11 having peripheral flanges such as 12 to add rigidity, and which may be provided with holes, not shown, whereby the same may be attached in a fixed location, e. g., the frame of an airplane. Surmounting the support 10 is a platform 14 having an overall construction similar to that of the support 10 and including any convenient means for attachment of the instrument for which the invention mount is intended. The precise configuration of the parts 10 and 14 and the means by which they serve to attach and be attached to, the instrument or ultimate support form no part of the invention per se.

Support 10 carries a pair of spaced bearing blocks 21—21 as shown which may be secured with their working axes in alignment by bolts 22 or other common expedient. Received in a bore 24 (Fig. 5) in each of the blocks 21 is a bearing 25 of nylon or other material having equivalent characteristics provided with a central opening 26. This latter comprises a pair of frustoconical surfaces 27—27 joined at surface 28 of appropriate diameter to receive rotatably a link or sway-bar to be described and whereby the bearings may be slipped over the link without binding.

A similar pair of bearing blocks 32—32 is riveted or otherwise secured to the plate 14 as shown and includes wings 33—33 which are bored to receive bearings 34 swivelled in the wings and having a transverse bore 35 to receive other portions of the sway-bar alluded to.

This latter, identified at 41, comprises a round rod substantially of U-shape carried by its base 42 in the bearings 25—25 and, by the extremities of its legs 43—43, in the bearings 34—34 within which such legs are confined for axial movement. In this connection it will be understood that the bearings 21—21 are desirably spaced as far apart as dimensional considerations will permit.

By virtue of the arrangement just described it will be clear that the support 10 and plate 14 may be moved apart while remaining parallel, but are rigid against rotational movement about an axis perpendicular to the direction of displacement (axis A), and also about an axis extending perpendicularly to that axis and the axis of the bearings 21—21 (axis B). However, as will appear hereinafter such translational movement is limited to the maximum amplitude of anticipated vibratory displacement and as is the case with shock mounts generally.

To provide rigidity against rotation about an axis C which is perpendicular both to axes A and B a similar arrangement is provided and comprises a sway-bar 41a of configuration like that of part 41 and linked to equivalent bearings 21a—21a and 32a—32a. By analogy it will be clear that the sway-bar 41a and its associated bearings will function to restrain rotation of the platform 14 about the axes B and C.

In addition to the sway-bar linkages described, damping means are provided for absorbing vibration which would otherwise be transmitted from the support 10 to the platform 14. Exemplificatively I show four devices 61 each including cups 62 welded to the support 10 and platform 14 and receiving a compression spring 63 packed with steel wool or mesh. An assembly of this character is a well-known article of commerce and will therefore not be elaborated upon.

To restrain undue departure of the platform 14 from the support 10; viz. beyond that necessary to accommodate the maximum amplitude of vibration, I provide devices 66 (Fig. 3) including a cup 67 welded to the platform 14 and a stud 68 secured to the support 10 and passing through an aperture in the bottom of the cup. Cushion washers 69, preferably steel wool or mesh, are carried on the stud as shown and a lock washer 72 is fastened on the stud. Thus, the platform 14 is free to move vertically as limited by abutment of the cup on one or the other of the cushions 69—69.

By reason of the devices 61 and 66 the platform is free to oscillate under the effects of vibration with a maximum amplitude limited by the play of the cup 67 intermediate its cushions 69—69, but will be restrained against severe translational forces, such as acceleration of the airplane.

From the foregoing it will have been made clear that the invention organization provides a simple, inexpensive shock mount of minimal height and therefore calculated to be interposed between the instrument support and its fixed mounting within the same space ordinarily allocated to shock mounts not incorporating the sway-bar linkages.

It will be understood that the two linkages provide rotational rigidity about the three orthogonal axes and that, if full compensation is not required only one linkage need be employed.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

I claim:

1. In a shock mount to be interposed between a fixed location and a mounted device for allowing relative translational movement therebetween while providing rotational rigidity which includes a plate for securement to the fixed location, a second plate upon which the device may be mounted, and means interposed between said plates for absorbing translational vibratory movement therebetween, the combination comprising a first pair of coaxial bearings having a common axis affixed to one of said plates and spaced apart thereon, a second pair of coaxial bearings providing a rotational axis secured to the other said plate and having its axis parallel to the common axis of said first pair of coaxial bearings, and a sway bar connecting said plates through said bearings comprising a U-shaped member having its base pivoted on said common axis of said first pair of bearings, each leg of the member being provided with a shoe slidable relatively thereto and said shoes being journalled in respective ones of said second pair of bearings for rotation of said member about said rotational axis whereby translational displacement of said plates is enabled upon pivoting of said sway bar but rotation thereof about an axis perpendicular to the plane including said bar is prohibited.

2. The combination in accordance with claim 1 and further comprising a second U-shaped sway bar having its base oriented perpendicular to that of said first sway bar, a third pair of coaxial bearings affixed to said one of said plates and spaced apart thereon, and a fourth pair of coaxial bearings providing a second rotational axis secured to the said other of said plates, said second sway bar having its base pivoted in said third pair of coaxial bearings, each leg of said sway bar being provided with a shoe slidable relatively thereto and journalled in respective ones of said fourth pair of coaxial bearings.

References Cited in the file of this patent

UNITED STATES PATENTS

| 2,610,010 | Dodge | Sept. 9, 1952 |
| 2,717,134 | Ferber | Sept. 6, 1955 |

FOREIGN PATENTS

| 547,961 | Great Britain | Sept. 18, 1942 |